Patented Sept. 19, 1933

1,927,661

UNITED STATES PATENT OFFICE 1,927,661

PROCESS FOR TREATING ELECTRODES

Ralph M. Hunter and Louis E. Ward, Midland, Mich., assignors to The Dow Chemical Company, Midland, Mich., a corporation of Michigan No Drawing. Application February 2, 1931
Serial No. 513,049

8 Claims. (Cl. 204—4)

This invention provides an improved process for treating carbon or graphite electrodes, thereby making the same more resistant to deterioration and lengthening the life of/or otherwise materially benefiting the electrodes thus treated when utilized in the usual way, such as in the electrolysis of an aqueous solution of sodium chloride.

In electrolytic cells of the bi-polar type for the manufacture of caustic soda and chlorine, employing carbon or graphite electrodes which have a characteristically porous structure, it has been customary to impregnate the electrode with an oil or wax to seal the pores so as to prevent the diffusion therethrough of gaseous products of electrolysis. Hydrocarbon oils or waxes have been used for the purpose, but drying oils, particularly China-wood or tung oil, have been found to give the best results. Certain difficulties have been experienced with the use of such impregnated electrodes, however, arising chiefly from the gradual chlorination of the oil or wax in service. The chlorination appears to be accompanied by some expansion in volume. This action causes sweating or exudation of oil from the pores, and such oil, becoming detached from the electrodes, mixes with the electrolyte and is eventually carried to the diaphragm, causing fouling and obstruction of the same. The expansion also results in more or less rupturing of the electrode structure at the surface, disintegrating and causing the same to crumble and wear away unduly rapidly. Eventually, however, a stage is reached, after a considerable portion of the electrode has worn or crumbled away, when the remaining portion thereof acquires a hard, almost metallic character, in which condition it is much more permanent and resistant to oxidation and is otherwise greatly improved in serviceability. It is desirable to be able to produce the aforesaid improved structure of the electrode artifically under controlled conditions before the same is put in service, thereby to avoid waste which results when the change is effected during use in the electrolytic cell.

An improved method of treating electrodes of graphite and the like has been described in our copending application, Serial No. 461,632, filed June 16, 1930, now Patent No. 1,868,206. Briefly, this method consists in first impregnating the electrodes with China-wood oil or other drying oil and then subjecting the impregnated electrodes to an atmosphere of chlorine gas for an extended time, which chlorinating step alone may require a period of several weeks or even months. By this treatment the oil-impregnated electrodes take up considerable chlorine, the oil thereof forming a chlorinated oil product which tends to harden and more securely seal the pores of the electrodes. This chlorinating operation is slow and takes place only at or near the surface of the electrode owing to the practical impossibility of the chlorine penetrating deeply into a solid and relatively impervious body. The chlorination of the electrode is, therefore, more or less superficial and not uniform and complete. The useful life of these impregnated and chlorinated electrodes, however, is known to be increased in many instances as much as 50 per cent over that of electrodes impregnated but not so chlorinated. The method just referred to, although greatly superior to former methods of treating electrodes, yet has certain disadvantages, e. g. requiring a very large inventory of both electrodes and impregnating materials, and, furthermore, in yielding only an incompletely and non-uniformly chlorinated electrode.

We have now invented a new and improved chlorinated oil impregnated carbon or graphitized electrode and a process for making same, such electrode being particularly adapted for use in the electrolysis of alkali metal chloride solutions and embodying advantageous features superior to those hitherto employed. Our invention, then, consists in the product and process hereinafter fully described and particularly pointed out in the claims, the following description setting forth in detail one mode of carrying out the invention, such disclosed mode illustrating, however, but one of various ways in which the principle of the invention may be used.

According to our invention, carbon or graphitized electrodes are impregnated with a suitably prechlorinated drying oil. The oil, e. g. China-wood oil, is first chlorinated directly or dissolved in a suitable diluent, preferably at a temperature of about 30° to 70° C., care being exercised that the temperature during chlorination does not rise to a point at which the oil materially thickens or becomes sticky. The chlorination probably takes place largely by addition at the double bonds of the unsaturated drying oil, but some substitution may also occur. The treatment is regulated by observing the decrease of the iodine number of the oil. For instance, chlorination of a mixture of China-wood oil and kerosene in about equal parts, may be continued until the iodine number has been reduced from an original value of about 132-136 to a value approximately 0 to 15. The practical results obtained, however, are substantially in proportion to the degree of chlorination. For different oils or mixtures thereof, different degrees of chlorination may be found to give the best results. As a final test we may also determine the amount of chlorine contained in the final product.

The electrodes to be treated are first cleaned of foreign matter, such as dirt, etc., and are introduced into a suitable impregnating vessel in which they are subjected to a vacuum. The vacuum connection to the autoclave is then closed and the chlorinated oil prepared as described, is drawn into the autoclave until the electrodes are nearly or entirely covered. The autoclave and contents are then preferably subjected to pressure to facilitate the impregnation with the chlorinated oil. When impregnation is complete the pressure is released and the vacuum applied as before, after which the vacuum is released and the unabsorbed excess oil blown out by a stream of air or in other suitable manner, the electrodes then being cooled and discharged. Some unabsorbed oil may cling to the electrodes, which upon exposure to the air hardens and may be removed by scraping, buffing or by other mechanical operation. The impregnated electrodes may also be cleaned by washing with a solution of NaOH of proper concentration or with other suitable solvent or cleaning compound.

By this impregnating treatment the pores of the electrodes are uniformly filled and closed with the chlorinated oil and are thereby rendered impervious to the penetration of the electrolyte and protected from excessive deterioration due to oxidation or other causes when afterward used in the electrolytic cell. Electrodes treated in this way have been found to have a much longer life than those prepared according to methods heretofore in use. The protective action of the chlorinated oil is distributed throughout the body of the treated electrodes, instead of being limited to a layer at the surface. Furthermore, bleeding, sweating or exuding of oil due to chlorination in situ during use is practically entirely done away with.

The following example illustrates a preferred mode of carrying out our invention, but the invention is not limited thereto:—

100 gallons of a mixture consisting of approximately equal amounts of China-wood oil and kerosene was introduced into a chlorinating vessel and heated to about 30° C. A current of chlorine gas, which had previously been dried by passing through sulphuric acid, was now bubbled through the mixture, the temperature gradually rising to around 50° C., at which point the flow of chlorine was curtailed so as to prevent a further temperature rise. A chlorine pressure sufficient to overcome the hydrostatic pressure of the oil was maintained in the chlorinating vessel for about 48 hours. The iodine number of the oil mixture, which before chlorinating was 136, was reduced to 15, corresponding to an actual chlorine content of approximately 16 per cent.

100 pounds graphitized carbon electrodes were charged into an impregnator vessel, which was then closed and evacuated to an absolute pressure of about 1 to 2 pounds per square inch for two hours. The vacuum line to the impregnator vessel was then closed and the vessel connected to a tank containing the chlorinated mixed oils from the first step, and without releasing the vacuum, the chlorinated mixed oils were drawn into the impregnator vessel. The oil charged was then subjected to a gauge pressure of about 100 pounds for approximately 4 hours, when the pressure was released. Vacuum was again applied for 1 hour and then released, excess oil drained off and the impregnator blown with air and cooled. The electrodes thus treated were then removed from the impregnator and cleaned. A chlorinated oil content of 6 per cent was found to have been absorbed by the electrodes.

For purposes of comparison, an electrolytic chlorine cell of the bi-polar type was fitted out with electrodes treated according to our invention alongside of those treated by former methods and those impregnated as described in the patent application previously referred to. The electrodes treated as described in the present invention gave results materially superior to the latter method mentioned above and greatly superior to the electrodes treated by former methods. The comparative absence of oil oozing from the electrodes and the resulting good condition of the diaphragms in the cells entirely equipped with the electrodes treated by the present improved process at the termination of the preliminary runs was particularly noticeable. By use of our improved electrodes, the usual time of the preliminary runs on the first diaphragm on the cell, i.e. about one month, was extended to three months or more.

In the foregoing we have described an improved process for treating porous electrodes, particularly graphitized electrodes for use in electrolytic cells for the manufacture of chlorine, sodium hydroxide, etc., by electrolysis of an aqueous solution of sodium chloride. By our process we are able to reduce the complete time of treating to a few hours as against a period of weeks or months or more by other processes wherein a less satisfactory result is had.

It is noted that electrodes of varying size, shape, or condition of porosity, might require more or less time for impregnating with a given chlorinated oil or mixture of oils prepared according to the first step of our improved process. Numerous oils or mixtures of oils in addition to those previously named are applicable, e. g. linseed oil, cottonseed oil, menhaden, or other oxidizing or drying oils. The oils may also be mixed with diluents, such as kerosene, gasoline, naphtha, carbon tetrachloride or other chlorinated aliphatic or aromatic hydrocarbons.

In the impregnating step of our process we may heat the electrodes in any convenient manner to a moderately elevated temperature, e. g. as high as 200° C., to facilitate the penetration of the pores by the oil, while at the same time subjecting the charge in the impregnating vessel to pressure. As will be apparent to those skilled in the art, the degree of chlorination of the China-wood oil or equivalent drying oil may be varied within wide limits, a partial chlorination giving results in proportion to the amount of chlorine absorbed. It is considered that, in the case of China-wood oil or mixture thereof with a diluent, a chlorination to an iodine number between 0 and 100 will give good results. A similar result may be obtained by a bromination of the drying oil, the product thus made being equivalent to the chlorinated product for the purposes of the invention.

The invention also comprises a new and improved electrode characterized as a carbon or graphitized electrode that has been practically uniformly impregnated throughout with a chlorinated drying oil. Our improved electrode is further characterized as being substantially impervious to the penetration of aqueous solutions of alkali chlorides or the products of electrolysis thereof under the ordinary conditions of carrying out such electrolysis. The tendency to sponginess, softening, dusting, pitting, or premature breaking off in the cell, such as is characteristic of untreated or imperfectly treated carbon or graphitized electrodes, is also substantially absent therein.

Other modes of applying the principle of our invention may be employed instead of the one explained, change being made as regards the composition and process herein disclosed, provided the ingredients or steps stated by any of the following claims or the equivalent of such stated ingredients or steps be employed.

We therefore particularly point out and distinctly claim as our invention:—

1. In a process for treating carbon or graphitized electrodes, the steps which consist in chlorinating a drying oil and impregnating said electrodes with such chlorinated oil.

2. In a process for treating carbon or graphitized electrodes, the steps which consist in chlorinating China-wood oil and impregnating said electrodes with such chlorinated oil.

3. A new article of manufacture, a carbon or graphitized electrode substantially uniformly impregnated with a chlorinated drying oil.

4. A new article of manufacture, a carbon or graphitized electrode substantially uniformly impregnated with chlorinated China-wood oil.

5. In a process for treating carbon or graphitized electrodes, the steps which consist in chlorinating China-wood oil to an iodine number between 0 and 100 and impregnating the electrodes with such chlorinated oil.

6. As a new article of manufacture, a carbon or graphitized electrode impregnated with chlorinated China-wood oil having an iodine number between 0 and 100.

7. In a process for treating carbon or graphitized carbon electrodes, the steps which consist in chlorinating China-wood oil to an iodine number between 0 and 100, impregnating the electrodes with such chlorinated oil, and then cleaning the surface of the impregnated electrodes.

8. In a process for treating carbon or graphitized carbon electrodes, the steps which consist in chlorinating China-wood oil to an iodine number between 0 and 100, impregnating the electrodes with such chlorinated oil, and then cleaning the surface of the impregnated electrodes by washing the same with a sodium hydroxide solution.

RALPH M. HUNTER.
LOUIS E. WARD.